United States Patent
Kim

Patent Number: 6,005,324
Date of Patent: Dec. 21, 1999

[54] BRUSHLESS MOTOR AND METHOD OF MANUFACTURING A STATOR OF THE BRUSHLESS MOTOR

[75] Inventor: Hyung-Cheol Kim, Kyeongki-Do, Rep. of Korea

[73] Assignee: Daewoo Electronics Co., Ltd., Seoul, Rep. of Korea

[21] Appl. No.: 09/104,346

[22] Filed: Jun. 25, 1998

[30] Foreign Application Priority Data

Jun. 25, 1997 [KR] Rep. of Korea .................. 97-27007

[51] Int. Cl.⁶ ............................................. H02K 1/22
[52] U.S. Cl. .................. 310/268; 310/71; 310/67 R; 310/68 R; 310/89; 310/179; 310/208; 310/45
[58] Field of Search .................. 310/268, 71, 67 R, 310/68 R, 89, 179, 208, 45

[56] References Cited

U.S. PATENT DOCUMENTS

| | | |
|---|---|---|
| 4,340,833 | 7/1982 | Sudo . |
| 4,471,247 | 9/1984 | Cotton ........................... 310/45 |
| 4,633,110 | 12/1986 | Genco . |
| 4,804,574 | 2/1989 | Osawa . |
| 5,462,763 | 10/1995 | Kondoh . |
| 5,608,278 | 3/1997 | Mey et al. ....................... 310/90 |
| 5,635,783 | 6/1997 | Lee ................................ 310/90 |
| 5,760,502 | 6/1998 | Loenen et al. ................... 310/42 |
| 5,760,521 | 6/1998 | Ushiro ............................ 310/268 |

FOREIGN PATENT DOCUMENTS

| | | |
|---|---|---|
| 0 203 204 | 12/1986 | European Pat. Off. . |
| 0 444 539 | 9/1991 | European Pat. Off. . |
| 0 624 945 | 11/1994 | European Pat. Off. . |

Primary Examiner—Nestor Ramirez
Assistant Examiner—Thanh Lam
Attorney, Agent, or Firm—Pillsbury Madison & Sutro LLP

[57] ABSTRACT

A brushless motor has a housing including an upper housing and a lower housing; a P.C.B. installed in the upper housing, a stator provided at an underside of the P.C.B., the stator having a plurality of coil layers piled up with each other and insulation layers interposed between coil layers, the coil layers being electrically connected to each other by a conductance member for generating an electric field, a rotor having permanent magnets which are radially disposed on an upper surface of the rotor in such a manner that adjacent permanent magnets have different poles from each other to generate a magnetic field which makes electromagnetic-interaction with the electric field of the stator to rotate the rotor, and a rotating shaft integrally formed at a center of the rotor so as to rotate when the rotator rotates. The brushless motor is advantageous in that since the coil is uniformly patterned, the magnetic field is uniformly generated. And, since the thickness of the stator is thin, the size of the motor becomes small.

8 Claims, 7 Drawing Sheets

BRUSHLESS MOTOR AND METHOD OF MANUFACTURING A STATOR OF THE BRUSHLESS MOTOR

BACKGROUND OF THE INVENTION

1. Field of the Invention

The present invention relates to a motor, and more particularly to a brushless motor and a method of manufacturing a stator of the brushless motor.

2. Description of the Prior Art

A motor is an apparatus for converting an electric energy to a revolution movement so as to generate the mechanical power.

Generally, motors are classified as an electric motor, a pneumatic motor, and a hydraulic motor. The electric motor has a stator to which permanent magnets are attached for generating a magnetic field, a rotor around which an amateur coil is wound so as to generate a torque thereby rotating, a commutator which supplies the electrical current to the stator and periodically converts an electrical polarity, a rotating shaft which is integrally formed to the rotor for rotating while the rotor is being rotated, and a bearing which supports the rotating shaft for rotating.

When the electrical current is supplied to the electric motor, the electric current is supplied to the amateur coil wound around the rotor. When the electric current flows through the amateur coil, an electric field is generated around the amateur coil. The electric field is applied to a magnetic field so as to create an electromagnetic force. The electromagnetic force rotates the rotor by 90 degrees in a direction based on a Fleming's rule. At this time, the direction of the electric current which flows through the amateur coil is converted into a reverse direction by the rotation of the commutator so that the rotor continuously rotates.

The electric motor is disclosed in a U.S. Pat. No. 4,633,110 (issued to Jerry etc).

Figure 1:
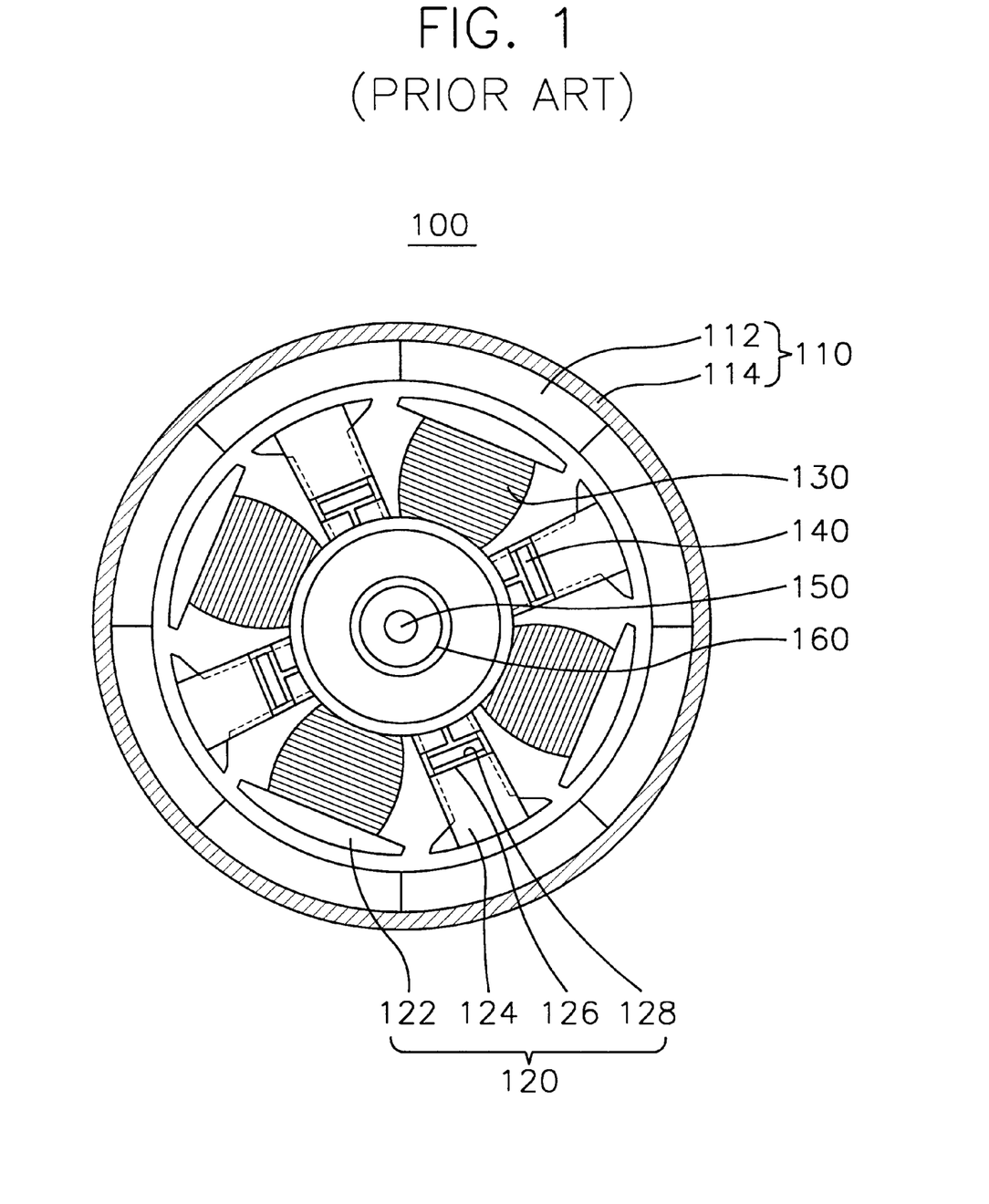
FIG. 1 is a plan view showing the conventional electrical motor.

FIG. 1 is a plan view showing the conventional electric motor 100. As described in FIG. 1, the electric motor has a stator core 120 around which a coil 130 is wound, a rotor 110 spaced apart from an outer periphery surface of the stator core 120 by a predetermined distance and rotatably mounted, plurality of terminals 140 inserted into a socket 126 formed at a lower portion of the stator core 120 and electrically connected to the coil 130, and P.C.B (not shown).

The stator core 120 is formed at a center portion thereof with a central opening 160, and the rotating shaft 150 penetrates the central opening 160. The rotating shaft 150 is integrally connected to a cup of the rotor 110 so that the rotating shaft 150 rotates while the rotor 110 is being rotated.

The stator core 120 is provided with four main-stator poles 122 and four sub-stator poles 124 formed between the four main-stator poles 122. The coil 130 is respectably wound around the four main-stator poles 122, and the socket 126 is respectably and integrally formed at a lower portion of the four sub-stator poles 124. The socket 126 is formed at an end portion thereof with an opening 126, and an end portion of the plurality of terminals 140 is respectably inserted into the opening 126.

An end portion of the coil 130 is connected to a middle portion of the plurality of terminals 140 by welding so that the coil 130 is electrically connected to the plurality of terminals 140. And, since the plurality of terminals 140 are electrically connected to the P.C.B (not shown), the coil 130 is electrically connected to the P.C.B (not shown). Accordingly, when the electric current is applied to the P.C.B (not shown), the electric current flows the coil 130 through the plurality of terminals 140 so that the magnetic field is created around the stator core 120. The magnetic field is applied to the magnetic field created by the permanent magnetic 112 so as to generate the electromagnetic force. Accordingly, the torque is generated between the rotor 110 and the stator core 120, and the rotor rotates with respect to the stator core 120.

However, in the conventional electrical motor, since the coil having a small diameter is wound around the stator core, it is difficult to uniformly wind the coil around the stator core. Accordingly, it is difficult for the rotating shaft to uniformly rotate by the uniform magnetic field. Furthermore, when the capacity of the motor is increased, the size of the motor is also increased.

SUMMARY OF THE INVENTION

Accordingly, the present invention has been made to solve the foregoing problem, and in order to achieved the above object, the brushless motor comprises:

a housing including an upper housing and a lower housing;

a P.C.B. installed in the upper housing;

a stator provided at an underside of the P.C.B., the stator having a plurality of coil layers piled up on top of each other and insulation layers interposed between coil layers, the coil layers being electrically connected to each other by a conductance member for generating an electric field;

a rotor having permanent magnets which are radially disposed on an upper surface of the rotor in such a manner that adjacent permanent magnets have different poles from each other to generate a magnetic field which makes electromagnetic-interaction with the electric field of the stator to rotate the rotor; and a rotating shaft integrally formed at a center of the rotor so as to rotate when the rotator rotates.

According to the present invention, the stator includes a first coil layer formed by a photolithograpy, a first insulation layer which are formed on an underside of the first coil layer by applying an insulation material to the underside of the first coil layer, a first hole which is formed at a predetermined portion of the first insulation layer by an etching process and in which the conductance member is filled up, a second coil layer which is patterned at an underside of the first insulation layer, a second insulation layer which are formed on an underside of the second coil layer by applying the insulation material to the underside of the second coil layer, a second hole which is formed at a predetermined portion of the second insulation layer by the etching process and in which the conductance member is filled up, and a third coil layer which is patterned at an underside of the second insulation layer. The conductance member is filled up in the first and second holes by a copper jumper process. The first and second holes are formed at centers of the first and second insulation members, respectively.

The second and third coil layers are patterned at the underside of the first and second insulation layers by a copper jumper process, respectively. The first coil layer has a plurality of first spiral coils which are arranged about the rotating shaft and are patterned in a clockwise direction and the second coil layer has a plurality of second spiral coils which are arranged about the rotating shaft and are patterned in a counter-clockwise direction, so that an electric current applied to the first coil layer is transferred to the second coil layer. Each coil layer includes even-numbered spiral coils.

The P.C.B. includes an annular base and an extension plate which is integrally formed with the annular base, the extension plate extending out of the housing passing through an opening formed at a side wall of the upper housing.

Each coil layer includes six spiral coils and the extension plate is provided at an upper surface thereof with an electric signal control section for periodically supplying the electric current to the six spiral coils.

A method of manufacturing a stator of a brushless motor, the method comprising the steps of:

(1) patterning a first coil layer to an underside of a P.C.B. by a photolithography;

(2) forming an insulation layer by applying an insulation material to an underside of the first coil;

(3) patterning a second coil layer to an underside of the insulation layer; and (4) electrically connecting the first and second coil layer to each other.

The method, between steps (2) and (3), further comprises steps of forming a hole in the insulation by an etching process and filling a conductance member in the hole.

The conductance member is pilled up in the hole by a copper jumper process. Step (3) is performed by a copper jumper process. The method further comprising a step of forming a plurality of coil layers which are piled up on top of each other by interposing the insulation layer therebetween.

The brushless motor is advantageous in that since the coil is uniformly patterned, the magnetic field is uniformly generated. And, since the thickness of the stator is thin, the size of the motor becomes small.

BRIEF DESCRIPTION OF THE DRAWINGS

The above object and advantages of the present invention will become more apparent by describing in detail preferred embodiments thereof with reference to the attached drawings, in which:

FIGS. 5 A), B) and C) are a plan view showing a plurality of spiral coil portions of the stator according to the present invention;

DETAILED DESCRIPTION OF THE INVENTION

Hereinafter, a preferred embodiment of the present invention will be explained in more detail with reference to the accompanying drawings.

Figure 2:
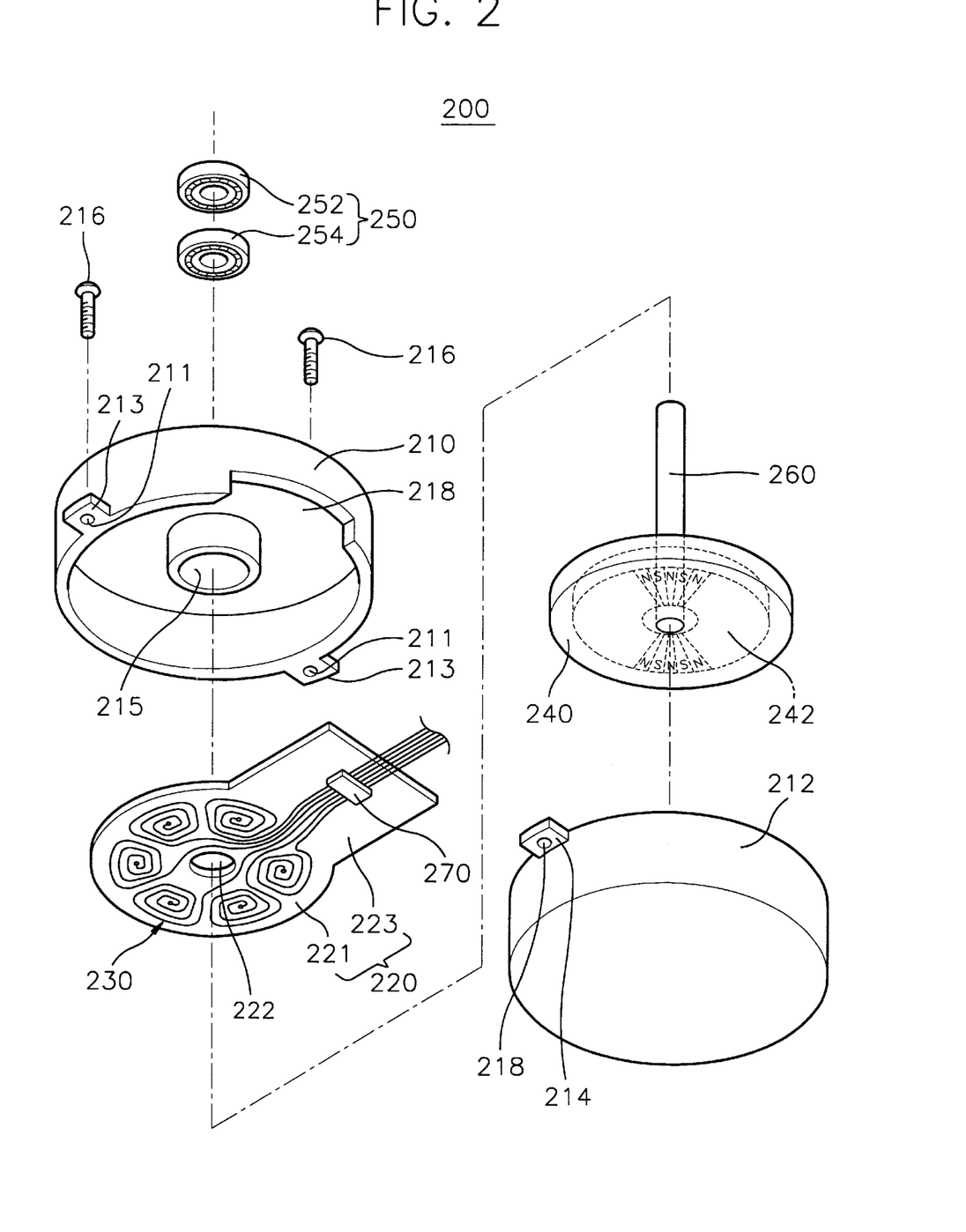
FIG. 2 is a partial perspective view showing the brushless motor according to the present invention.
Figure 3:
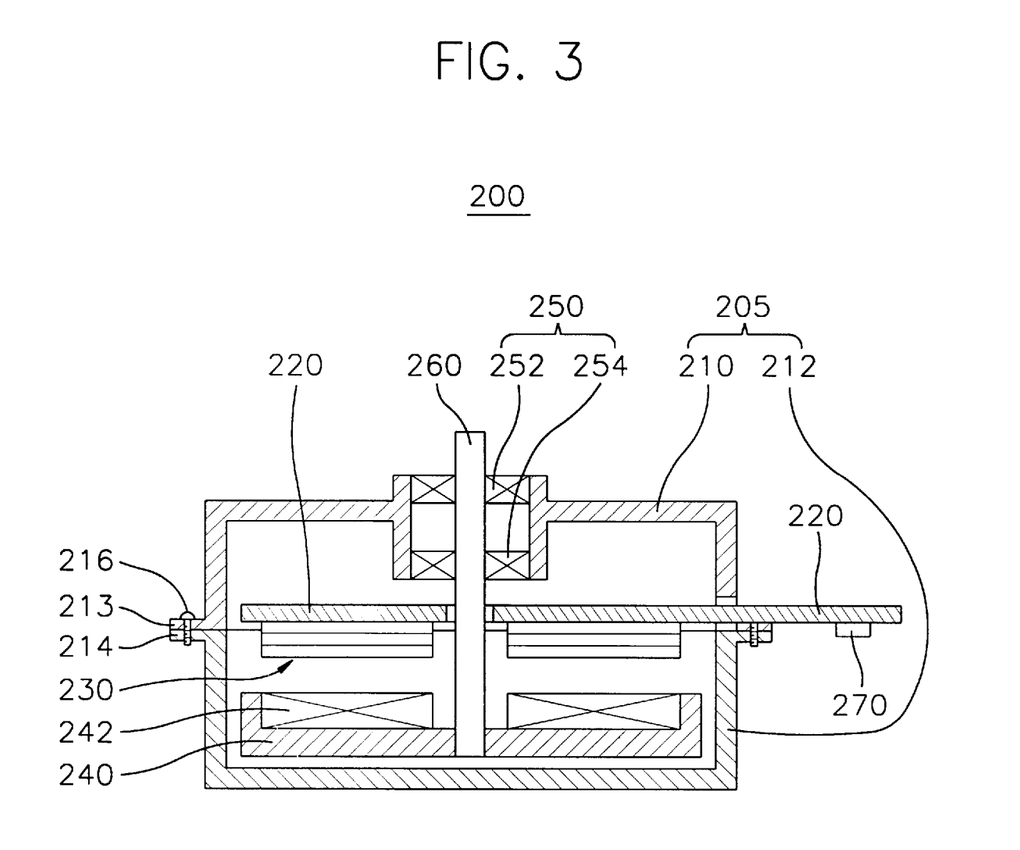
FIG. 3 is a sectional view showing the brushless motor according to the present invention.

FIG. 2 is a partial perspective view showing the brushless motor according to the present invention, FIG. 3 is a sectional view showing the brushless motor according to the present invention. As illustrated, the brushless motor 200 has a housing 205 having an upper housing 210 and a lower housing 212, a P.C.B 220 installed in the upper housing 210, a stator 230 provided at an underside of the P.C.B 220 and having a plurality of coil layers piled up on top of each other by a photolithography method, a rotor 240 spaced apart from the lower surface of the stator 230 and having permanent magnets 242 which are disposed at an inner peripheral surface thereof, a rotating shaft 260 rotatably connected to the upper housing 210 by a bearing 210, and an electric signal control unit 270 installed at an end portion of the P.C.B 220 and periodically supplying the electric current to the stator 230.

The P.C.B 220 includes an annular base 221 and an elongated plate 223 integrally formed at an end portion of the annular base 221. And, the elongated plate 223 extends out of the upper housing 210 through the opening 218 formed at a side wall of the upper housing 210.

Figure 6:
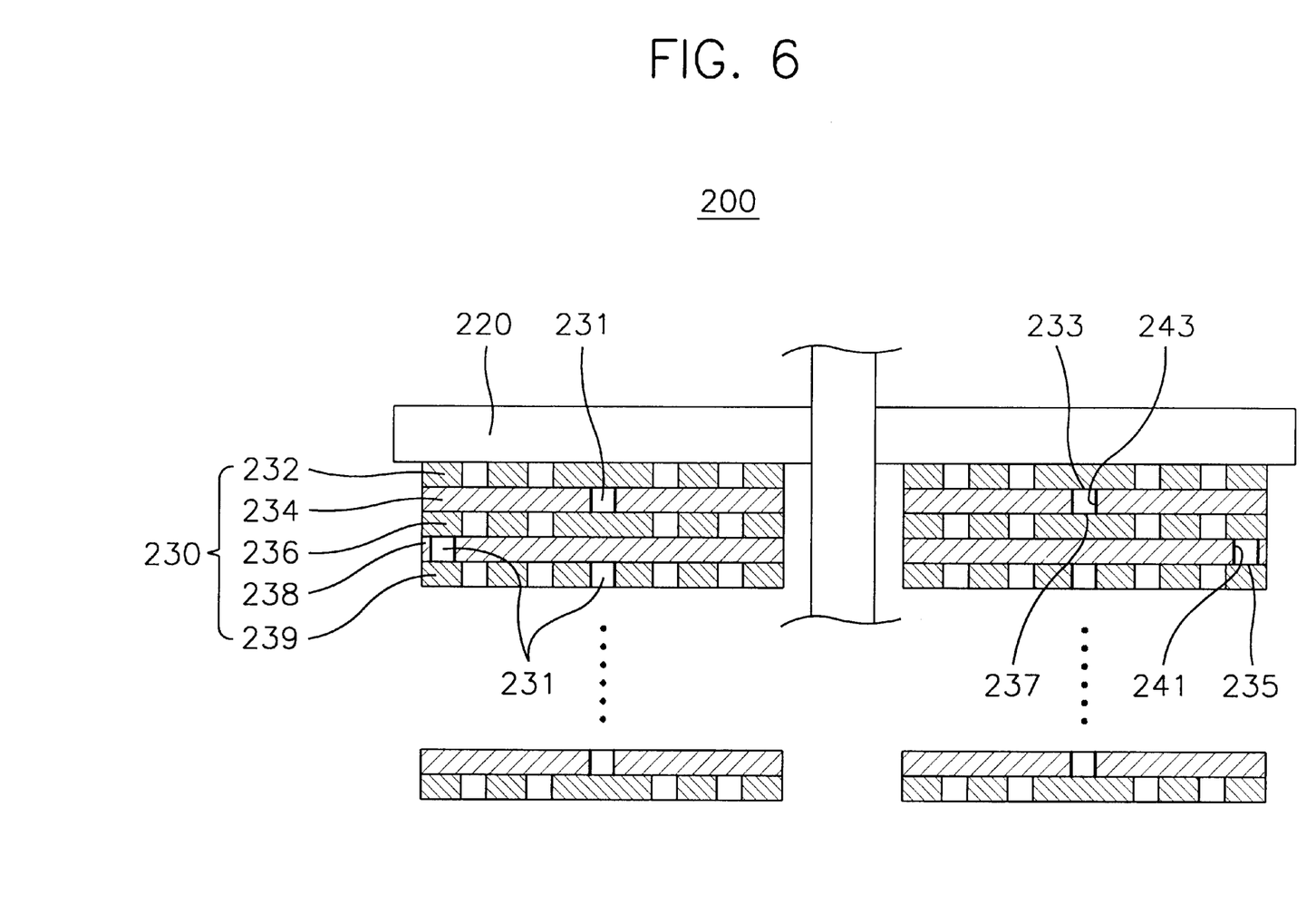
FIG. 6 is a sectional view showing each coil layer of the stator according to the present invention.

The stator 230 is provided at the underside of the P.C.B 220 by the photolithography method. As illustrated in FIG. 6, first, a conductance material such as a copper is applied on the lower surface of the P.C.B 220 so as to form a copper layer. And chemical solution such as Chrome is applied on the copper layer for forming a photo register, and a photo mask on which the coil shape is printed is placed on the photo register.

When a light is irradiated on the photo mask, a coil shape which is similar to the photo mask is patterned on the surface of the photo register formed at the underside of the copper layer. After the above process, an etching solution is applied on the P.C.B 220, and the etching solution reacts with the copper layer so that a first coil layer 232 is formed. After forming the first coil layer 232, an insulating material is applied on the first coil layer 232 so that a first insulation layer 234 is formed on the underside of the first coil layer 232.

On the other hand, if the plurality of coil layers are piled up on the underside of the P.C.B 220, each coil layer should be electrically connected to each other by a conductance member 231. Therefore, a first hole 233 is formed at a predetermined portion of the first insulation layer 234 by an etching process and in which the conductance member 231 is piled up. And, after the above process, the conductance member 231 and a second coil layers 236 are formed by the Cu-Jumper method. That is, a liquefied copper is injected into the hole 233 formed by the photography method to form the conductance member 231, and the liquified copper is patterned along the coil shape on the surface of the first insulating layer 234 so that the second coil layer is patterned at the underside of the first insulation layer 234. After patterning the second coil layer 236, the insulating material is applied on the underside of the second coil layer 236 so as to form a second insulating layer 238. A second hole 237 is formed at a predetermined portion of the second insulation layer 238 by an etching process and in which the conductance member 231 is piled up. And, after the above process, the conductance member 231 and a third coil layer 239 are formed by the Cu-Jumper process. That is, a liquefied copper is injected into the second hole 237 formed by the photography method to form the conductance member 231, and the liquefied copper is patterned along the coil shape on the surface of the second insulating layer 238 so that the third coil layer 239 is patterned at the underside of the second insulation layer 238. And, it is possible to form the plurality of coil layers on the underside of the P.C.B 220 by repeating the above process.

Figure 4:
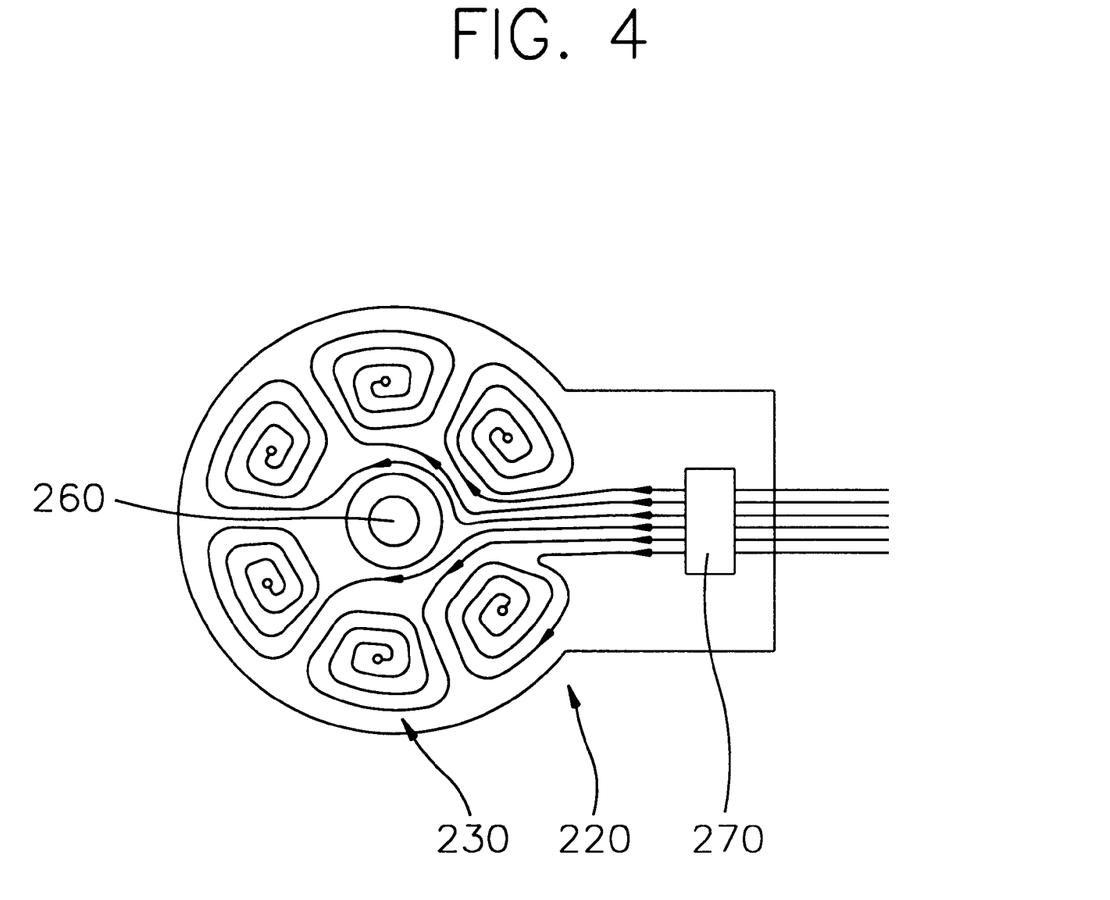
FIG. 4 is a plan view showing the stator on which the coil is printed of the brushless motor according to the present invention.

FIG. 4 is a plan view showing the stator, on which the coil is patterned, of the brushless motor according to the present invention. As illustrated, the electrical signal control unit 270 periodically supplying the electric current to the stator 230 and the stator 230 for generating the electric field by the electric current supplied from the electrical signal control unit 270 is formed on the underside of the P.C.B 220. The stator 230 includes plurality of spiral coil portions which are patterned thereon. And, the plurality of spiral coil portions are symmetrically arranged centering about the rotating shaft.

Figure 5A:
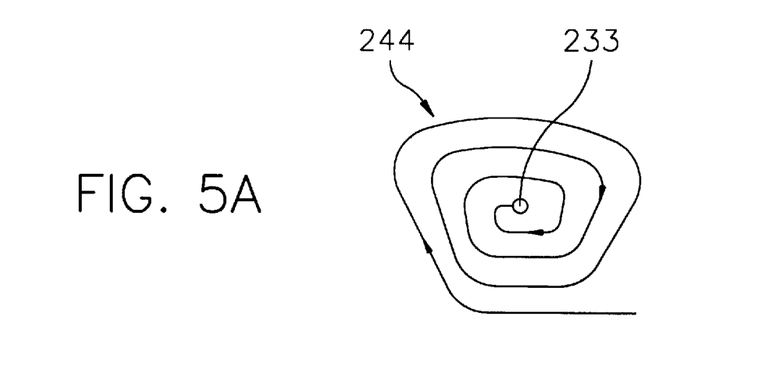
Figure 5B:
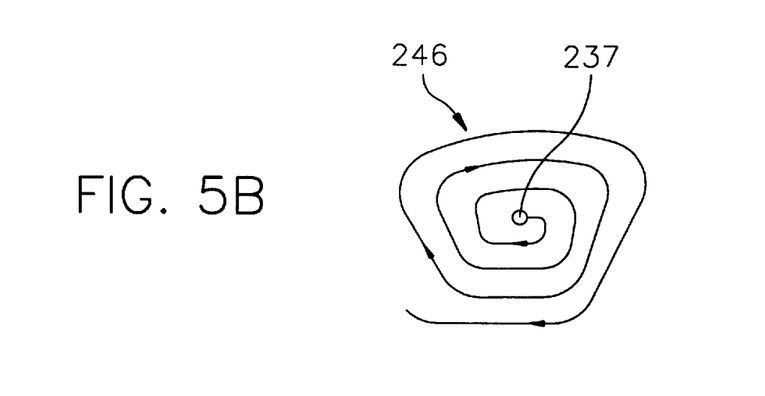
Figure 5C:
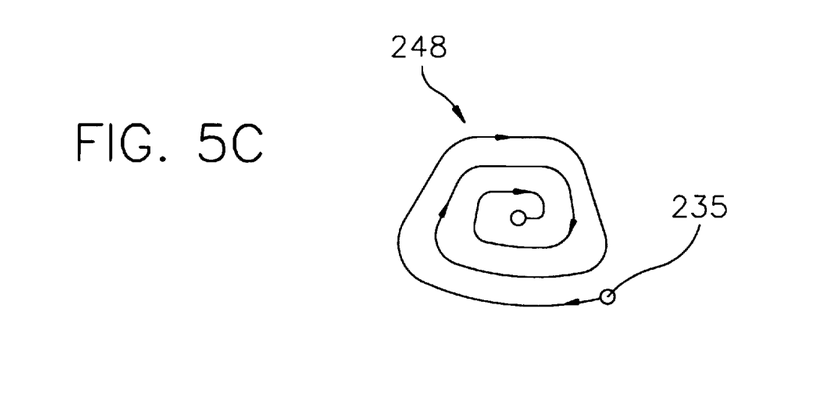

As illustrated in FIGS. 5 *a*), *b*) and *c*), a first spiral coil portion 244 patterned on the surface of the P.C.B 220 (FIG. 6) is patterned in a clockwise direction, and the first spiral coil portion 244 has a first center point 233. And, a second spiral coil portion 246 formed on the second coil layer 236 (FIG. 6) is patterned in a counterclockwise direction, and the second spiral coil portion 246 has a second center point 237. A third spiral coil portion 248 formed on the third coil layer 239 (FIG. 6) is patterned in the clockwise direction, and the third spiral coil portion 248 has a third end point 235. And, the conductance member 230 (FIG. 6) passes through the first, second center points 233 and 237 and the third end point 235 so that the first, second and third coil layers 232, 236, and 239 are electrically connected to each other by the conductance member 230 (FIG. 6). The conductance member 230 is formed by means of the Cu-Jumper method.

Referring to FIGS. 2 and 3, the rotor 240 is spaced apart from the underside of the stator 230 by the predetermined distance. The rotor 240 has a cylindrical shape, and has permanent magnets 242 which are radially disposed on an upper surface of the rotor 240 in such a manner that adjacent permanent magnets 242 have different poles from each other to generate a magnetic field which makes electromagnetic-interaction with the electric field of the stator 230 to rotate the rotor 240. The rotating shaft 260 is integrally formed at a center of the rotor 240, so as to rotate when the rotor 240 rotates.

The upper housing 210 is formed at an upper portion thereof with a circular opening 215, and an upper and lower bearings 252 and 254 are mounted at an inner portion of the upper housing 210. Accordingly, the rotating shaft 260 is rotatably attached to the upper housing 210 by the upper and lower bearings 252 and 254.

The upper housing 210 is integrally formed at a lower portion of the outer peripheral surface thereof with a first bracket 213 formed at a center portion thereof with a hole 211, and the lower housing 212 is integrally formed at an upper portion of the outer peripheral surface thereof with a second bracket 213 formed at a center portion thereof with a hole 218. A fixing member 216 such as a bolt penetrates these holes 211 and 218 so that the upper and lower housings 210 and 212 are integrally assembled.

Hereinafter, the operation of the brushless motor according to the present invention will be explained in more detailed in reference to FIGS. 3 and 6.

When the electric current is applied to the electric signal control unit 270, the electric signal control unit 270 applies the electric current to the first spiral coil portion 244 (FIG. 5A) of the first coil layer 232 patterned on the underside of the P.C.B 220. The electric current applied to the first spiral coil portion 244 flows to the first center point 235 thereof in the clockwise direction, and the electric current is applied to the second center point 237 of the second spiral coil portion 246 (FIG. 5B) of the second coil layer 236 through the conductance member 231 and finally applied to the third end point 235 of the third coil layer 239. Since the second spiral coil portion 246 (FIG. 5B) is patterned in the counterclockwise direction, the electric current flows in a constant direction from the first coil layer 232 to the third coil layer 239. Therefore, when the electric current flows the stator 230, the plurality of coil layers are operated as one stator, thereby generating the electric field. The magnetic field is applied to the magnetic field generated by the permanent magnets 242 so that the electromagnetic force is generated. Accordingly, the torque is generated between the rotor 240 and the stator 230 by the electromagnetic force so that the rotor 240 rotates by the predetermined angle. At this time, the electric signal control unit 270 regularly applies the electric current to the plurality of spiral coil portions so that the rotor 240 continuously rotates with respect to the stator 230.

Hereinafter, the method for patterning the coil will be explained with reference to the accompanying drawings.

Figure 7:
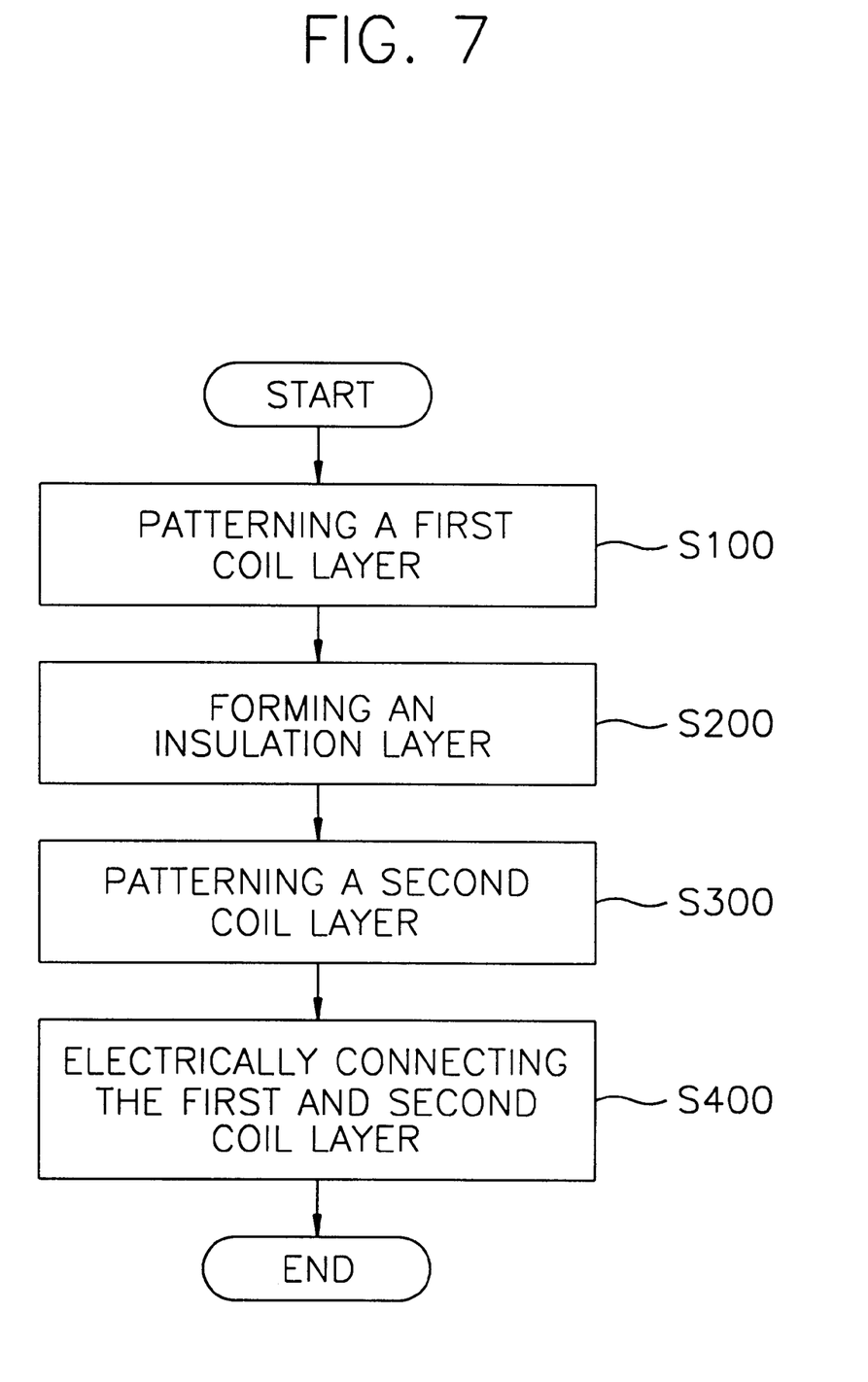
FIG. 7 is a flow chart showing manufacturing steps of the stator according to the present invention.

FIG. 6 is a sectional view showing each coil layer of the stator according to the present invention, and FIG. 7 is a flow chart showing manufacturing steps of the stator according to the present invention.

A method of manufacturing the stator of the brushless motor comprises the steps of (1) patterning a first coil layer to an underside of a P.C.B. by a photolithography, (2) forming an insulation layer by applying an insulation material to an underside of the first coil, (3) patterning a second coil layer to an underside of the insulation layer, and (4) electrically connecting the first and second coil layer to each other.

In step (1) S100, the first coil layer 232 is formed on the underside of the P.C.B 220 by the photolithography process. First, the conductance material such as a copper is applied on the lower surface of the P.C.B 220 so as to form the copper layer. And chemical solution such as Chrome is applied on the copper layer for forming a photo register, and a photo mask on which the coil shape is printed is placed on the photo register.

When a light is irradiated on the photo mask, a coil shape which is similar to the photo mask is patterned on the surface of the photo register formed on the underside of the copper layer. After the above process, an etching solution is applied on the P.C.B 220, and the etching solution reacts with the copper layer so that a first coil layer 232 is formed.

In step (2) S200, after forming the first coil layer 232, an insulation material is applied to the first coil layer 232 so that an insulation layer 234 is formed on the underside of the first coil layer 232. At this time, if the plurality of coil layers are piled up on the underside of the P.C.B 220, each coil layer should be electrically connected to each other by a conductance member 231. Therefore, a first hole 233 is formed at a predetermined portion of the first insulation layer 234 by an etching process and in which the conductance member 231 is piled up.

In step (3) S300, after forming the first insulating layer 234, a second coil layer 236 is formed by the Cu-Jumper process on the underside of the first insulating layer 234. The liquified copper is patterned along the coil shape on the surface of the first insulating layer 234 so that the second coil layer 236 is formed on the first insulating layer 234.

In step (4) S400, after patterning the second coil layer 236, the first and second coil layers 232 and 236 are electrically connected to each other by the conductance member 231 having the conductance material such as copper. That is, a liquified copper is injected into the first hole 233 formed by the photolithography process to form the conductance member 231.

On the other hand, it is possible to pile up the plurality of coil layers on the underside of the P.C.B 220 by repeating the above steps (S200–400).

As explained through the embodiment, the brushless motor is advantageous in that since the coil is uniformly patterned, the magnetic field is uniformly generated. And, since the thickness of the stator is thin, the size of the motor becomes small.

While the present invention has been particularly shown and described with reference to preferred embodiments thereof, it will be understood by those skilled in the art that various changes in form and detail may be effected therein without departing from the spirit and scope of the invention as defined by the appended claims.

What is claimed is:

1. A brushless motor comprising:

a housing including an upper housing and a lower housing;

a P.C.B. installed in the upper housing;

a rotor having permanent magnets which are radially disposed in such a manner that adjacent permanent magnets have different poles from each other to generate a magnetic field;

a rotating shaft integrally formed with a center portion of the rotor; and a stator provided at an underside of the P.C.B., the stator having a plurality of coil layers piled up on top of each other and insulation layers interposed between coil layers, the coil layers being electrically connected to each other by a conductance member for generating an electric field, each of the coil layers including a plurality of spiral coils thereon which are arranged around the rotating shaft and have different phases from each other for uniformly generating magnetic fields and interacting with the rotor at substantially the same electromagnetic forces with regard to the phases, the spiral coils being alternately patterned in clockwise and counter-clockwise directions with regard to the coil layers whereby the spiral coils having each phase on different coil layers are superimposed in a vertical direction.

2. The brushless motor as claimed in claim 1, wherein the stator includes a first coil layer formed by a photolithograpy, a first insulation layer which is formed on an underside of the first coil layer by applying an insulation material to the underside of the first coil layer, a first hole which is formed at a predetermined portion of the first insulation layer by an etching process and in which the conductance member is piled up, a second coil layer which is patterned at an underside of the first insulation layer, a second insulation layer which is formed on an underside of the second coil layer by applying the insulation material to the underside of the second coil layer, a second hole which is formed at a predetermined portion of the second insulation layer by the etching process and in which the conductance member is piled up, and a third coil layer which is patterned at an underside of the second insulation layer.

3. The brushless motor as claimed in claim 2, wherein the conductance member is piled up in the first and second holes by a copper jumper process.

4. The brushless motor as claimed in claim 2, wherein the first and second holes are formed at centers of the first and second insulation members, respectively.

5. The brushless motor as claimed in claim 2, wherein the second and third coil layers are patterned at the underside of the first and second insulation layers by a copper jumper process, respectively.

6. The brushless motor as claimed in claim 1, wherein each coil layer includes even-numbered spiral coils.

7. The brushless motor as claimed in claim 1, wherein the P.C.B. includes an annular base and an extension plate which is integrally formed with the annular base, the extension plate extending out of the housing passing through an opening formed at a side wall of the upper housing.

8. The brushless motor as claimed in claim 7, wherein each coil layer includes six spiral coils and the extension plate is provided at an upper surface thereof with an electric signal control section for periodically supplying the electric current to the six spiral coils.

* * * * *